R. T. HAZELTON.
MACHINE TOOL TRIP.
APPLICATION FILED AUG. 27, 1918.

1,390,706.

Patented Sept. 13, 1921.
8 SHEETS—SHEET 1.

INVENTOR
Robert T. Hazelton
BY Albert F. Nathan
ATTORNEY

Fig. 3.

R. T. HAZELTON.
MACHINE TOOL TRIP.
APPLICATION FILED AUG. 27, 1918.

1,390,706.

Patented Sept. 13, 1921.
8 SHEETS—SHEET 4.

INVENTOR
Robert T. Hazelton
BY Albert F. Nathan
ATTORNEY

R. T. HAZELTON.
MACHINE TOOL TRIP.
APPLICATION FILED AUG. 27, 1918.

1,390,706.

Patented Sept. 13, 1921.
8 SHEETS—SHEET 5.

INVENTOR
Robert T. Hazelton
BY Albert F. Nathan
ATTORNEY

R. T. HAZELTON.
MACHINE TOOL TRIP.
APPLICATION FILED AUG. 27, 1918.

1,390,706.

Patented Sept. 13, 1921.
8 SHEETS—SHEET 6.

Inventor
Robert T. Hazelton
By
Attorney
Albert F. Nathan

R. T. HAZELTON.
MACHINE TOOL TRIP.
APPLICATION FILED AUG. 27, 1918.

1,390,706.

Patented Sept. 13, 1921.
8 SHEETS—SHEET 7.

INVENTOR
Robert T. Hazelton
BY Albert F. Nathan
ATTORNEY

UNITED STATES PATENT OFFICE.

ROBERT T. HAZELTON, OF CINCINNATI, OHIO, ASSIGNOR TO THE CINCINNATI MILLING MACHINE COMPANY, OF OAKLEY, CINCINNATI, OHIO, A CORPORATION OF OHIO.

MACHINE-TOOL TRIP.

1,390,706.     Specification of Letters Patent.    Patented Sept. 13, 1921.

Application filed August 27, 1918. Serial No. 251,599.

*To all whom it may concern:*

Be it known that I, ROBERT T. HAZELTON, a citizen of the United States, and residing at Cincinnati, in the county of Hamilton and State of Ohio, have invented a new and Improved Machine-Tool Trip, of which the following specification is a full disclosure.

This invention deals with machine tools and it proposes sundry improvements imparting thereto a greater degree of facility in the manipulation and control thereof. The improvements constituting this invention are especially applicable to so-called milling machines and are of advantage in enhancing the simplicity of a mechanism which inherently possesses a more or less complex organization by reason of its wide range and universality of action.

One of the objectives of this invention is to render available, for machine tool requirements an automatic instrumentality affording a centralized control enabling a great diversity of cycles of operation to be readily obtained. That is to say, in order that the highest possible efficiency may be attained in the manufacture of various articles, it is essential to use fast speeds in the travel of the cutter relative to the work at all times other than those actually devoted to the cutting of the work, when the comparatively slow feeding rate must, of course, be employed. This means that quick traverses should alternate with the feeds, and quick returns and reverses should be available, and the machine must be universal in point of adaptability to meet the great diversities of cycles demanded by the necessities of the different manufacturing needs.

Another object is to provide a universal control of the aforesaid nature which will be proof against any adjustment that would otherwise result in broken parts as a result of carelessness by the user in initially arranging the trips for automatic action.

Other advantages and objects will be in part indicated in the following description, and in part rendered apparent in connection with the annexed drawings.

To enable others skilled in the art so fully to apprehend the underlying features hereof that they may embody the same by the numerous modifications contemplated by this invention, drawings depicting a preferred typical construction have been annexed as a part of this disclosure, and in such drawings, like characters of reference denote corresponding parts throughout all of the views, of which:

Fig. 5 is a perspective of the serrated cam or indent which, in the uppermost position of the master controller, coöperates with a pawl or detent for retaining the master controller in any one of three angular positions.
Fig. 6 is a perspective of another indent which will coöperate with the pawl in the lowermost position of the master controller to retain it in either of two angular positions.
Fig. 18ᵃ is perspective of a bell crank lever forming part of the safety device shown in Fig. 18.

The control elements hereinafter to be described, may be incorporated into any conventional machine tool so as to control movements of the work or tool supporting member, as, for example, the table, saddle or knee of a universal milling machine such as herein shown.

Figure 25:
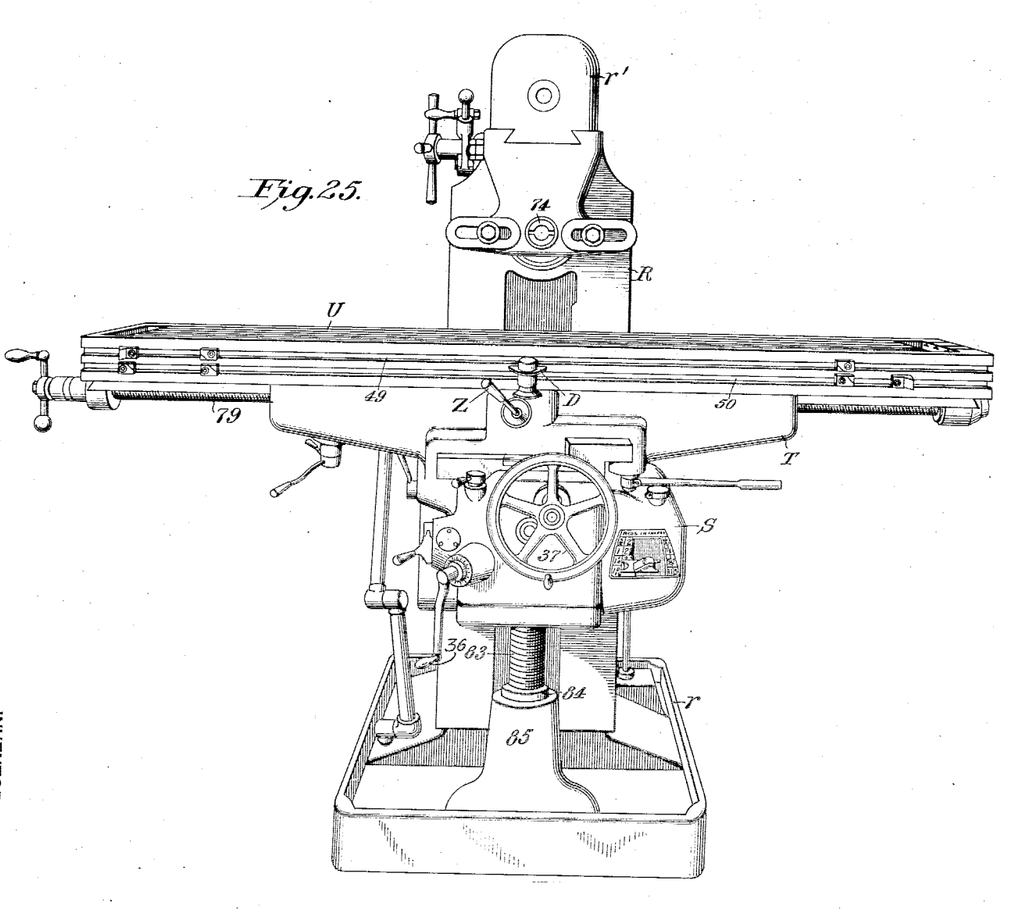
Fig. 25 is a general perspective of the machine.

Referring to Fig. 25, there will be seen a universal milling machine consisting of a so-called column R extending upwardly from a suitable bed-plate $r$ and having at its upper end a so-called overarm $r'$ which supports a rotary spindle 74 which carries a conventional milling cutter. In this type of machine, the cutter is rotated but not translated, and the object to be machined is bolted to a so-called table which is bodily moved so as to bodily move the object and present it progressively to the action of the cutting tool. In a universal machine it may be desirable to move the object either vertically, or right and left, or in and out, and to permit this to be done, the frame of the general mechanism for supporting the object is subdivided into three components termed a knee, which moves vertically on the column; the saddle, which moves in and out on the knee; and a table, which moves right and left on the saddle. The knee is indicated here by S; the saddle by T; and the table by U.

In order to impart the necessary movements to either of these three elements, appropriate gearing extends to each and is adapted to be connected kinetically with some element deriving motion through the feed-change mechanism aforesaid.

The table U derives its "feed" motion (see Fig. 1) from the shaft 16 driven by a gear 13 meshing with another gear 12 connected through a yieldable friction-clutch 11 with a gear 10 meshing with a pinion $k$ keyed to the shaft K propelled by the main-power at the desired rate of "feed" predetermined by the feed-change gears.

Figure 2:
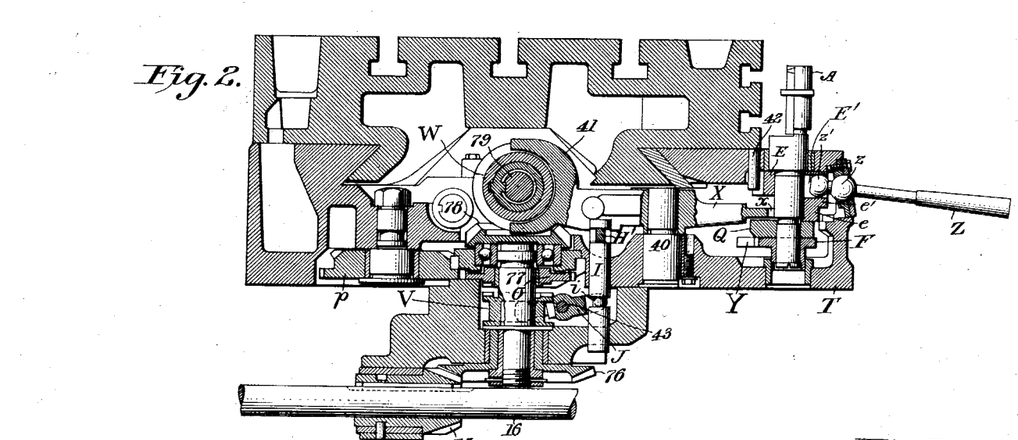
Fig. 2 is a transverse vertical section through the table and the saddle to show certain elements of the control mechanism; same being taken through line 2—2 of Fig. 3.
Figure 3:
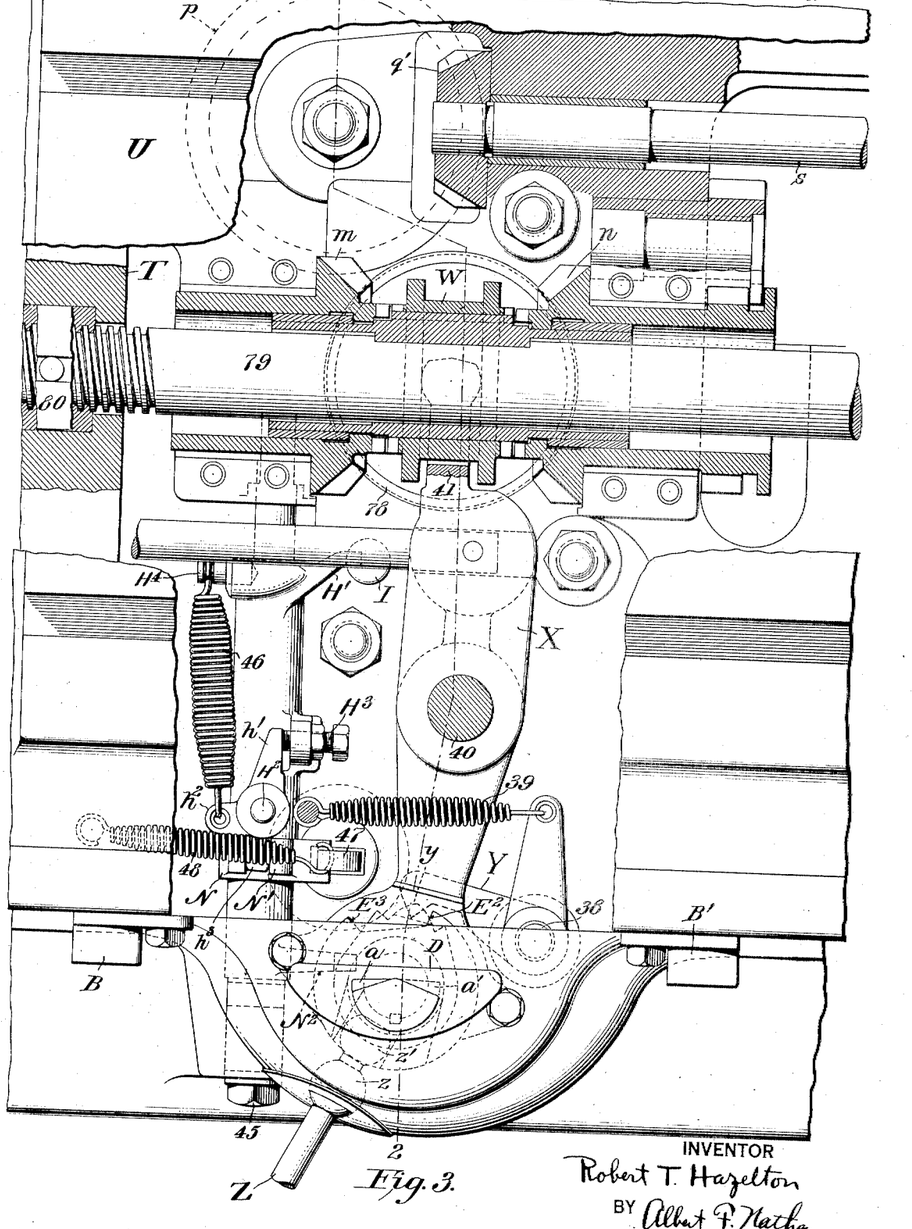
Fig. 3 is a plan, with certain parts broken away, showing the source of the quick rate of motion as well as portions of the controlling instrumentality.

Referring to Fig. 2, this shaft is shown extending parallel with the direction of movement of the saddle T on the knee S and transversely to the direction of slide of the table U to the saddle T. The shaft 16 extends through a beveled pinion 75 which is journaled in a portion of the frame of the saddle T so as to permit a shifting of the saddle relatively to the knee without interfering with the shaft 16. The bevel gear 75 meshes with another bevel gear 76 which idles on the stub-shaft 77 but which may be mechanically connected therewith whenever it is desired to "feed" the table by shifting the clutch V into the lower position shown by Fig. 2. This causes the stub-shaft 77 to rotate at the slow or "feeding" rate and thereby drive the bevel gear 78 and rotate the two bevel gears $m$ and $n$ (see Fig. 3) in opposite directions. These bevel gears $m$ and $n$ are sleeved around the feed-screw 79 of the table U and are normally disconnected therefrom but, by shifting the clutch W, either one or the other may be caused to rotate the feed-screw 79 either to the right or the left, as the case may be. This feed-screw engages a nut 80 fixed to the saddle T and at its ends is non-translatably journaled to the table so that, as it rotates, it will cause the table to travel to the right or the left. Since the parts thus described may all receive their motion through the feed-change mechanism, it will be perceived that the table will feed at the predetermined rate and that the direction of feed may be changed very easily and quickly by merely shifting the hand lever Z.

Clutch V, when shifted to its upper position to engage a gear $o$ will disconnect the table from the aforesaid feed-change mechanism and will substitute a connection with a fast return transmission consisting of the gear $o$, meshing with a gear having a bevel $p$ geared to another bevel gear $q'$ (see Fig. 3) secured to a shaft $s$ which through suitable connections (not shown) receives motion from the prime mover of the machine in any appropriate manner.

The knee may be caused to feed up or down, if desired, by shifting the clutch M (see Fig. 1) either to the right or to the left. This clutch is splined to the shaft 17 and when shifted one way, it will engage the gear 18 through the teeth 30 and drive the shaft 17 in one direction; or, when shifted to the other side, it will connect the gear 31 through the teeth 29 with the same shaft 17 and drive it in the opposite direction. The gears 18 and 31 rotate oppositely because gear 18 meshes directly with gear 14 fixed to shaft 16, whereas gear 31 receives its motion through an idler 32 meshing with gear 15, also fixed to shaft 16. Shaft 17 carries a bevel gear 33 which meshes with a bevel gear 34 fixed to the shaft 35. When the clutch M is thrown out, the shaft 35 may be rotated manually by turning the crank 36.

Figures 1, 18A:
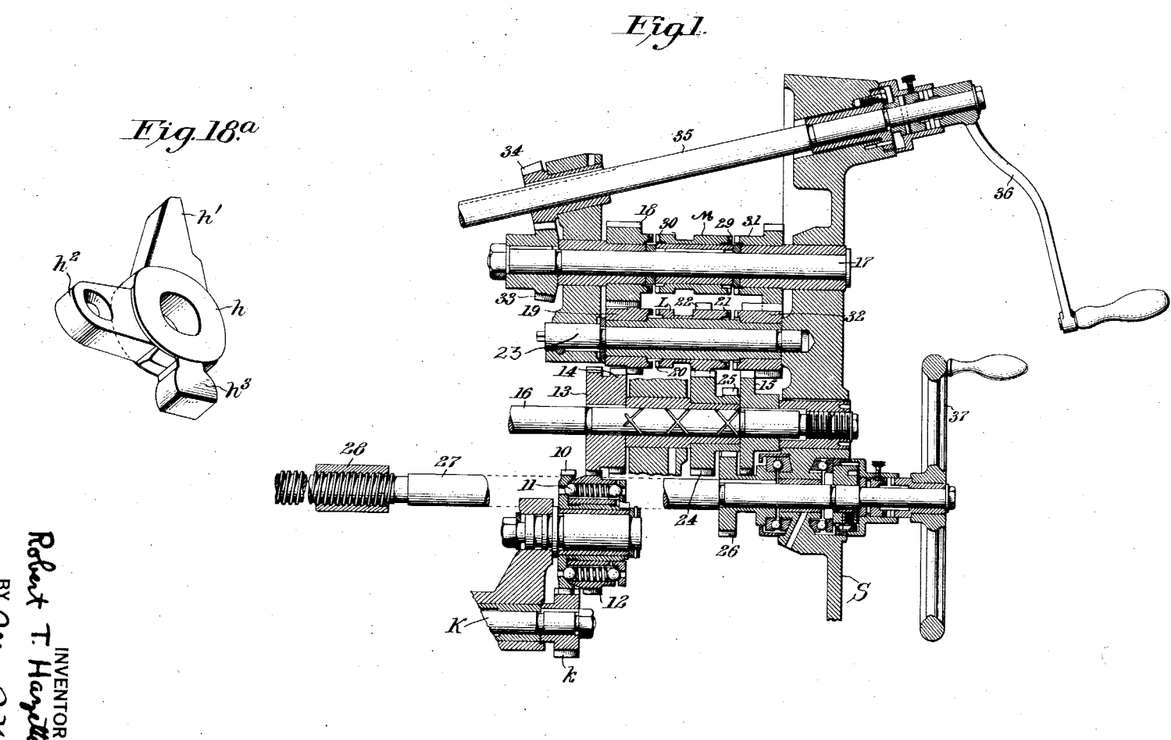
Figure 1 is a sectional development in a plane of the gearing and transmission elements for transmitting motion from the source of power (through a suitable feed-change mechanism) to the table, knee and saddle, respectively, whereby these elements may be moved at the slow rate required for tooling purposes.

Shaft 35 is suitably geared to a vertical feed-screw 83 non-translatably journaled in the frame of the knee S. This vertical feed-screw 83 passes through a nut 84 carried by the standard 85 uprising from the base $r$, thereby enabling the feed-screw to raise and lower the knee.

The saddle in an analogous manner may be caused to feed in and out by motion derived through the aforesaid feed-change mechanism.

Referring to Fig. 1, 28 indicates a nut appropriately secured to the saddle T and adapted to be screwed in and out by the worm on the end of the shaft 27 which extends parallel to the direction of slide of the saddle T and the knee S. This shaft 27 is non-translatably journaled in the frame of the knee S and it is provided with a hand-wheel 37 whereby it may be manually actuated and also with gearing whereby it may be mechanically rotated in either direction. Thus, the gear 26 meshes with a gear 25 which is secured to a gear 24 meshing with the gear 22 on a shiftable clutch L. This clutch is freely sleeved to a shaft 23 and at its opposite ends is provided with clutch teeth 20 and 21, whereby it may be connected either with gear 19 or with gear 32. The former receives motion from the gear 18 which is driven oppositely to the shaft 16 by directly engaging with gear 14, whereas the gear 32 is driven directly by the gear 15 by the same shaft 16. Thus, gears 19 and 32 are both permanently driven in opposite directions by the shaft 16 and, by shifting the clutch L to engage the one or the other, the saddle T may be caused to feed either in or out as desired.

It will be seen that the foregoing mechanism has the capacity (by virtue of the clutches W and V) of effecting a reversal in the direction of the relative translation between the rotating cutter and the work (through clutch W), as well as effecting the change in the rate of the relative translation (through clutch V) so as to produce either the comparatively slow rate commonly termed a "feed" or the fast rate known as a "quick traverse;" the latter expression being used when the slow and quick movements are in the same direction resulting in what is sometimes termed an "intermittent feed." Or, by simultaneously shifting both the clutches W and V, the mechanism will not only change the rate but will also change the direction of movement, thereby enabling the mechanism to change from a "feed" in one direction to a "quick return" in the other direction, or vice versa. Furthermore, by holding the clutch W in its midway or neutral position, the machine will cause the relative translation to cease between the continuously rotating cutter and the work, i. e., the continuously rotating cutter will cease to advance bodily with respect to the work or, conversely, the work will cease to advance with respect to the continuously rotating cutter.

This invention contemplates the use of a master controlling-element capable of being set into any one of five different positions and so connected with the aforesaid clutches as to produce any one of the above mentioned conditions. This master controller is indicated on the drawings by A and it is capable of being moved into any one of five different positions and retained in such positions by suitable detent devices. Preferably, this is attained by partial rotations and by bodily displacements of the central controller as, for example, by so mounting it that it may be translated in an axial direction or moved angularly, and by assigning two of these positions to the bodily translations and three of the positions to the angular displacement or partial rotation of the master element A.

Figures 14, 15, 16, 17, 24:
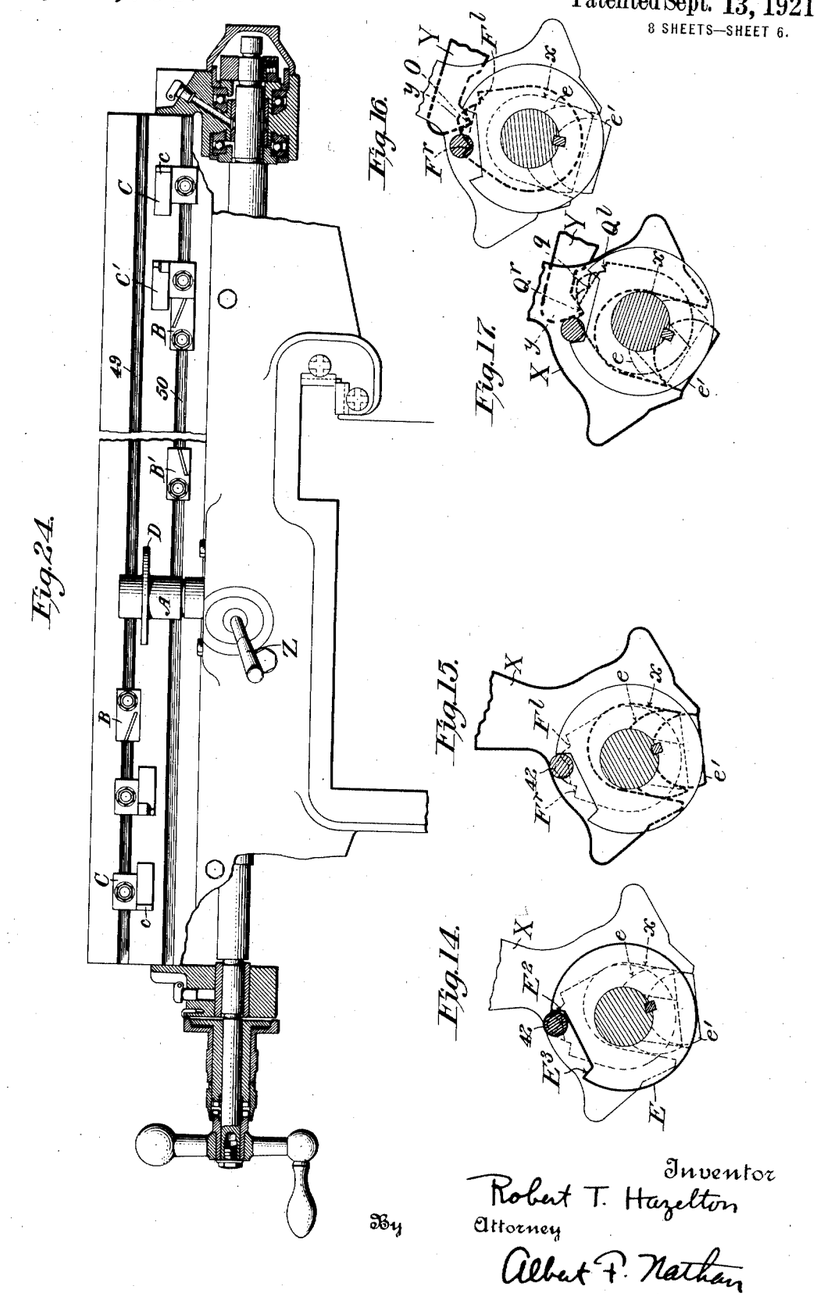
Figs. 14, 15, 16, and 17 are diagrams showing the stop for limiting the angular movement of the master controller, showing the manner in which the master controller oscillates the reversing lever, showing the pawl and indent device for retaining the master controller in three different angular positions corresponding to the right feed, the left feed, and the stop of the table, and showing the pawl and indent for retaining the master controller in the two different angular positions corresponding to the quick traverse to the right and left, respectively.
Fig. 24 is a front elevation showing the arrangement of the dogs on the table.
Figures 18, 19, 20, 21:
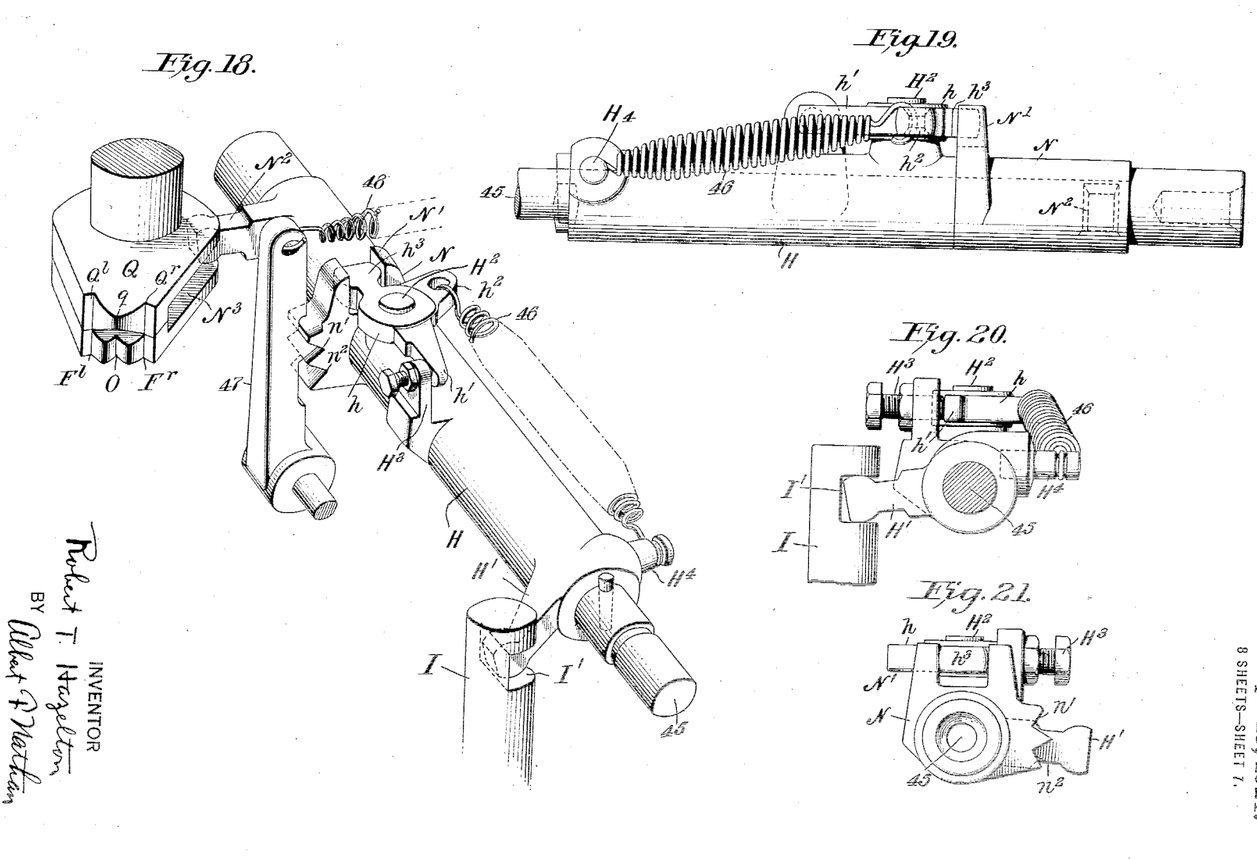
Fig. 18 is a perspective of the rock sleeve embodying a safety device whereby the vertical movement or translation of the master controller is transmitted to the clutch controlling the rate of movement.
Fig. 19 is a side elevation of the assembled rock sleeve.
Figs. 20 and 21 are end elevations thereof.
Figure 22:
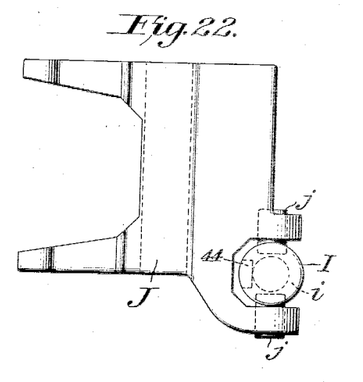
Figs. 22 and 23 are a plan and a side elevation, respectively, of the fork for operating the clutch V, together with the pin connecting it with the above mentioned rock sleeve.
Figure 23:
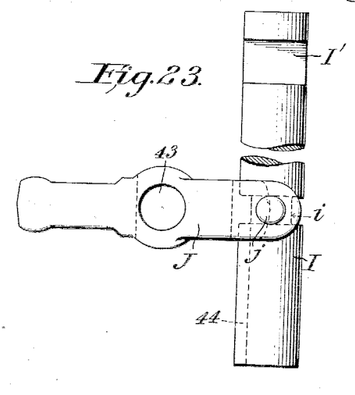

The detent mechanism is here shown in the form of two cams in the form of serrated members F and Q, suitably affixed to or formed integrally with the master controller A. They are arranged to coöperate alternately with a suitable pawl, when the master controller is raised or lowered so that, in its raised position, the master controller may be retained in any one of three different angular positions, and when lowered, may be retained in either of two angular positions. The last two mentioned angular positions preferably coincide with the two extreme angular positions first mentioned so that when the pawl is in either one or the other, the raising and lowering of the master controller will not involve any extra partial rotation. The indent F is provided with three depressions or recesses $F^1$ (corresponding to feed to the left), O (indicating zero motion), and $F^r$ (indicating feed to the right), and these recesses are brought into co-action with a pawl Y which is pivoted on a post 38 secured in the saddle. This pawl is in the form of a bell-crank lever and is urged against the indent F by means of a spring 39. The pawl is provided with a pointed portion $y$, serving as a detent and the upper surface of the detent is beveled off or inclined so as not to interfere with the downward movement of the other indented member Q when the controller A is lowered. The other indented member Q, as best seen from Fig. 17, is provided with two indents or recesses $Q^r$ and $Q^1$ which are in vertical alinement with the recesses $F^r$ and $F^1$ in the lower indented member F, so that when the detent of the pawl is in the recess $Q^r$, it will slide readily into the recess $F^r$, and conversely, when the controller A is raised and lowered; and in like manner for the recesses or indents Q¹ and F¹. It is desirable, however, to provide only two indents in the upper member Q and, therefore, instead of providing a recess corresponding to zero, the upper member Q is provided with a detent or peak $q$ in vertical alinement with the indent O of the lower member F. The lower surface of the peak or detent $q$ is beveled off so that when the controller A is depressed, this bevel will coöperate with the bevel on the detent or pawl and will shift it laterally until the pawl coincides with the plane of the member Q; whereupon the detent of the pawl will cause the controller A to turn either to the right or the left to lodge the detent either in the indent $Q^r$ or $Q^1$. It will accordingly be seen that this mechanism causes the controller A to assume either one of five different positions; three of them being provided in its upraised position and two of them being provided in its depressed position.

The master controller A is so connected with the clutches that, when in its upraised position, it may shift the direction-reversing clutch W into any one of three different positions corresponding to movement of the table to the right, stoppage of the table, or movement of the table to the left. This mechanism comprises a lever X pivoted to a post 40 and having a forked extremity 41 engaging the clutch W. This lever is therefore pivoted so as to oscillate in a horizontal plane and its other extremity is bifurcated as indicated by $x$ so as accurately to embrace, without backlash, a cam $e$ eccentrically located on the actuator E. Therefore, when the master controller A is in its elevated position, the clutch-shifting lever X will occupy definitely any one of three different positions corresponding to the angular movement of the master controller and, as there is no backlash between the forked end $x$ and the eccentric cam $e$, there must be an absolute correspondence in positions. When the master controller A is in its depressed position, however, it is necessary to provide considerable backlash in order that the action of the dogs (to be hereinafter described) may be certain. That is to say, it is necessary that the master controller, under the action of the dogs, shall not pause for any appreciable length of time in passing over the neutral or zero point. Otherwise, the table would not properly execute its reverse when being driven at a fast rate. That is to say, when the master controller A is in its lowermost position, the table will travel at a fast rate and the direction of movement (while at this rate) may be reversed by partially rotating the master controller through a contact with a properly constructed dog. If it was rotated slowly, it is evident that it would take some time in passing through the zero point and, consequently, the table would cease to be propelled and the dog carried thereby would cease to advance far enough to throw the master controller into its reverse position. Therefore, it is desirable, under these conditions, that the master controller should be capable of moving for a considerable distance without affecting the reverse lever X and this is provided for by means of the other cam $e'$, also eccentrically located with respect to the axis of the master controller and so constructed that its limits of movement coincide with the limits of movement of the first mentioned cam $e$, but differing therefrom by reason of providing considerable backlash as appears plainly from the diagrams shown by Figs. 14 to 17, inclusive.

To enable the master controller A to be manually actuated, a hand lever Z has a ball-and-socket mounting $z$ on the saddle and it terminates in a globular extension $z'$ which enters a cylindrical aperture E' in the side of the actuator E. This actuator also preferably provides two shoulders E² and E³ coöperating with a pin 42, thereby providing steps for definitely limiting the angular movement of the master controller A. The master controller is also provided with certain cam surfaces whereby it may be operated through dog action, as will be subsequently described.

The connection between the clutch Z and the master controller comprises a safety rock sleeve H, a plunger I actuated thereby, and the clutch lever J actuated by the plunger. The clutch lever J is pivoted to swing about a horizontal axis 43 and provides a fork for moving the clutch and, at its other end, is provided with a small bifurcation between the arms of which slightly project two pins $j$ which enter the slot $i$ in the plunger I which moves vertically through suitable recesses in the saddle and is restrained against rotation by means of a keyway 44. At its upper end, the plunger I is provided with a transverse slot I' which receives the extermity H' of the two-part safety sleeve H so that, as this sleeve rocks about its axis 45, the plunger must be raised and lowered and the clutch V shifted from the slow rate to the fast rate by means of the clutch lever J. The safety sleeve is actuated by a second sleeve N through a device that permits yield in one direction. This device $h$ is in the nature of a bell-crank lever pivoted to a post H² extending from the safety sleeve H, and having a contact arm $h'$ adapted to bear against an adjustable abutment H³ provided by the safety sleeve H. A contractile spring 46 is secured at one end to a post H⁴ extending from the safety sleeve and, at its other end, to an arm $h^2$ extending from the part $h$. This spring, as will be seen, normally maintains the part $h$ in abutment with the adjustable contact H³ so that, by exerting pressure on the extension $h^3$ of the member $h$, the safety sleeve may be rocked. The arrangement is such, however, that the movement is positive in one direction and impositive in the other. The actuating sleeve N is provided with a bifurcated extension N′ engaging the extension $h^3$ and, at its other end, the actuating sleeve N is provided with an arm N² that enters a recess N³ provided by the members Q and F, above described; thereby forming a tongue and slot connection. This recess is in the nature of a groove extending circumferentially so that when the master controller A is rotated, the above mentioned parts N, H, I, J, and the clutch V are not moved, but when the master controller is translated vertically, these parts are actuated to throw the clutch V.

The purpose of the aforesaid safety device is to prevent the machine from being so set as to cause the table to be moved rapidly during a pulling operation, to wit, when the cutter is actually in contact with the work. If the work is forced against the cutter faster than the cutter can remove the material, the machine might be injured and therefore this device provides enough elasticity in the mechanism for throwing the clutch into the fast rate so that the clutch cannot be actually engaged but its teeth will be permitted to ricochet and the clutch will be held from actual engagement, the extra motion being taken up by the yielding of the spring 46.

The actuating sleeve N is preferably retained in one or the other of its positions by detent mechanism and, to that end, it is provided with two indents $n^1$ and $n^2$ which are adapted to receive the detent of a lever 47 pulled by a spring 48 against the said indents.

The automatic means for actuating the foregoing mechanism comprises a number of dogs adjustably arranged in two series or paths on the table and adapted to actuate the master controller. For example, a dog of the type indicated by B is capable of effecting a vertical shifting of the master controller either downward, if the dog be mounted on the upper slot 49 of the table; or upward, if the dog be mounted along the lower slot 50 of the table.

Figure 4:
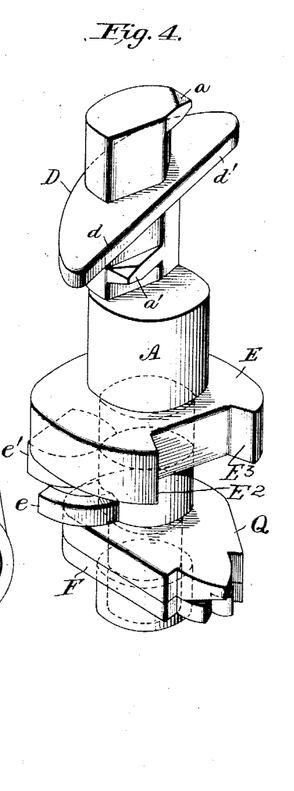
Fig. 4 is a perspective of the master controller.
Figure 5:
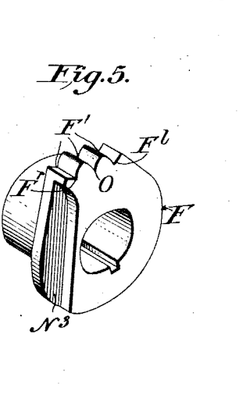
Figure 6:
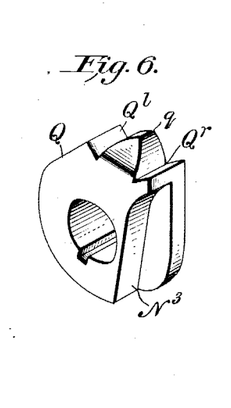
Figure 7:
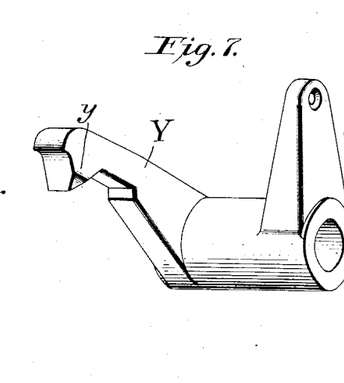
Fig. 7 is a perspective of the pawl or detent for cooperating with either one or the other of the indents according to the bodily displacement of the master controller.
Figure 8:
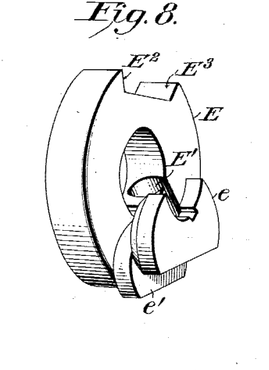
Fig. 8 is a perspective of the actuator secured to and forming a part of the master controller whereby it may be moved by a hand lever into any one of its five different positions and whereby it may shift the reversing lever when the master controller is partially rotated without effecting the reversing lever when the master controller is translated.
Figure 9:
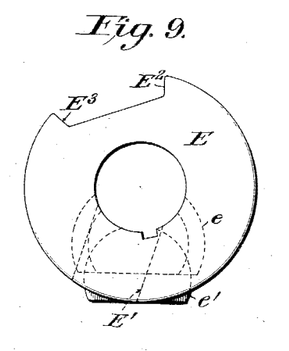
Figs. 9, 10, and 11 are a plan, a side elevation, and an inverted plan, respectively, of said actuator.
Figures 10, 11:
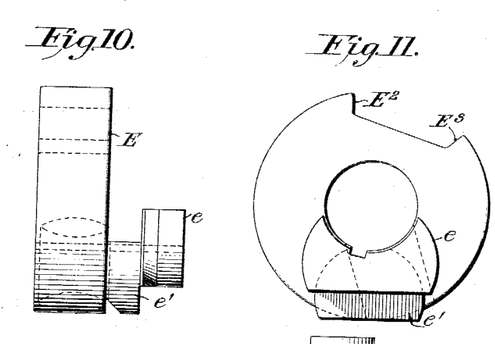
Figure 12:
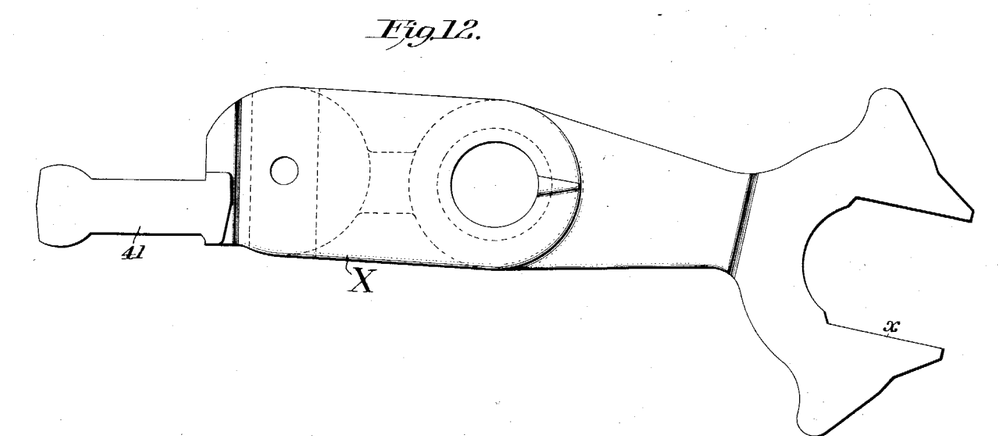
Fig. 12 is a plan of the reversing and stop lever and Fig. 13 is a side elevation thereof.
Figure 13:
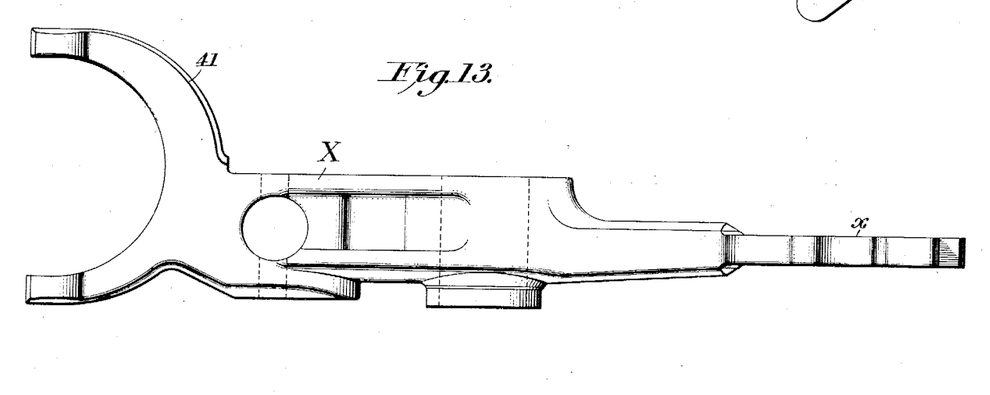

Referring to the perspective of the master controller, it will be seen that it provides upper and lower beveled projections $a$ and $a′$ arranged on opposite sides of the axis of the master controller. When the table is executing a movement to the right (either fast or slow), the upper projection $a$ of the master controller is functioning; whereas, when the table is executing a movement to the left (either fast or slow), the lower projection $a′$ of the master controller is in action. Dogs B and B′ are provided with inclined contact surfaces so that these dogs are enabled to seize the projection from the master controller and move it up or down, as the case may be. The effect of this is to change the rate of motion so that, from a slow motion, we may suddenly jump into a quick motion, or conversely. Thus, an intermittent action can be obtained by arranging a number of such dogs as B and B′ alternately either along upper slot 49 or the lower slot 50, so that these dogs, by operating against the projection from the master controller, will alternately move it up and down and thereby cause the table to advance either to the right or left, as the case may be, alternately slowly and rapidly. The stoppage or reversal of the table is effected by dogs of the type indicated by C which provide lateral edges $c$ adapted to ride against the edge of the oppositely extending wings $d$ or $d′$ of the vane or fin D forming a part of the master controller. When the master controller is turned either to the right or left of its neutral position, either the edge $d$ or the edge $d′$ will be projected into the path of the projection $c$ from the dog C and the effect of this will be to restore the master controller to its neutral position when contact is established. This will stop the advance of the table when the master controller is raised, i. e., in its feeding position. If, instead of stopping the table, it should be desired to cause it to execute a quick return, this can be accomplished by arranging a dog such as C′ in conjunction with a dog of the B type so that, at the end of the stroke, the dog B will first shift the master controller vertically into its fast-rate position and the table will then start executing a quick traverse and the dog C′ will thereby be brought into contact with the edge $d′$ of the fin D of the master controller. This will have the effect of moving the master controller past its dead center so that it will thereupon snap under spring action into a reverse movement and the table will return at a quick return rate. It is obvious that these dogs may be arranged in various different ways so as to attain various different cycles involving intermittent advances, quick returns, and automatic stoppages in any order or relation that may be desired.

Having thus revealed this invention, I claim as new the following combinations of steps and elements or equivalents thereof, and desire to secure the same by Letters Patent of the United States:

1. A machine tool combining propelling mechanism; a rate-changing clutch therefor; and means for operating said clutch, said means being constructed to act positively when moving said clutch into the position yielding a slow rate and impositively when moving said clutch into the position yielding a high rate of movement.

2. A machine tool combining propelling mechanism; a rate-changing clutch; a direction-changing clutch; a master controller adapted either to be rotated or shifted axially; a positive-acting connection between said controller and the direction-changing clutch whereby rotations of said controller will actuate said clutch; and a connection enabling an axial shift of said controller to actuate said rate-changing clutch, said connection being impositive when moved to increase the rate, and being positive when moved to decrease the rate.

3. A machine tool combining propelling mechanism; two clutches controlling said mechanism; a master controller; a lever directly connected at its opposite ends to one of said clutches and to said master controller and arranged to be actuated by rotations of the latter; a second lever having a tongue and slot connection with said master controller so as to be actuated by an axial shift; and means enabling said second lever to operate the other clutch.

4. A machine tool combining propelling mechanism; two clutches for controlling it; a master controller providing two cams; a lever for operating one of said clutches arranged to be brought into operative relation with one or the other of said cams by axially shifting said master controller; and means for enabling said master controller, when rotated, to actuate the other clutch.

5. A control mechanism for machine tools combining a table mounted for movement in reverse directions and providing upper and lower mountings for tripping dogs; a first assortment of dogs arranged adjustably in the upper mounting; a second assortment of dogs adjustably arranged in the lower mounting; a master controller provided with a vane for partially turning it when contacting with certain of said dogs, and also having upper and lower projections whereby said controller may be raised and lowered by the action of the dogs in the upper and lower mountings; and table propelling mechanism controlled by said master controller.

6. A machine tool combining a table; a master controller, providing a fin extending in opposite directions from its axis; dogs adjustably carried by said table adapted to contact said fin and rock said controller about its vertical axis; propelling mechanism for said table; and means for reversing said mechanism when said master controller is rocked about its vertical axis.

7. A machine tool combining a table; a master controller adapted to rock about a vertical axis and adapted also to be moved bodily in the direction of said axis, said master controller being provided with oppositely extending wings; a hand lever having a ball and socket connection with said controller to either elevate or rock it; dogs carried by said table and constructed to contact with said wings to rock said controller irrespective of the vertical shifting of said master controller; and propelling mechanism for said table adapted to be reversed when said master controller is rocked.

8. A machine tool combining a table; a master controller providing upper and lower oppositely extending wedge-shaped projections; dogs adjustably arranged on said table for coöperating with said projections to shift said master controller bodily in a vertical direction; propelling mechanism for said table; and means for changing the rate of propulsion in accordance with the bodily shifting of said master controller.

9. A machine tool combining a table; a master controller providing upper and lower oppositely extending projections and also providing an elongated fin arranged radially to its axis; dogs for moving said master controller vertically by contacting said projections; dogs for swinging said master controller by contacting said fin; propelling mechanism for said table; and means for enabling said master controller by its vertical and swinging movements to change either the rate or the direction of movement of said propelling mechanism.

10. A machine tool combining a table; a master controller presenting contact surfaces arranged radially to its axis; dogs movable with said table for impacting said surfaces and swinging said master controller, said master controller also presenting contact surfaces inclined with respect to its axis; dogs for elevating or lowering said master controller by contacting said inclined surfaces; and table propelling mechanism controlled by said master controller.

11. A machine tool combining a table; a master controller presenting a radial contacting surface; a dog carried by said table for swinging said master controller, said controller also having a wedge-shaped projection extending oppositely to said radial surface; another dog adapted to contact said projection to vertically move said master controller when said projection has been brought into its path by the action of the first dog; and table propelling means controlled by said master controller.

12. A machine tool combining a table; a master controller presenting upper and lower oppositely extending beveled projections and an intermediate radially extending contact surface; an upper series of dogs carried by said table for raising and lowering said master controller; a lower series of dogs for similarly affecting said master controller through contact with its lower projection; and other dogs adapted to move said master controller by impacting its radial surface so as to render effective either the upper or the lower projection.

13. A machine tool combining a table; propelling mechanism therefor including a rapidly rotating member having clutch teeth; counterpart clutch having teeth engageable therewith to receive motion therefrom and thereby propel said table; and an impositive shifter for said clutch actuated by the movement of the table so as to become inoperative if the rotations of said clutch are unduly opposed by the traverse of the table.

In witness whereof I hereunto subscribe my name, as attested by the two subscribing witnesses.

ROBERT T. HAZELTON.

Witnesses:
SOL EINSTEIN,
H. T. WILLIAMS.